(12) United States Patent
Liron et al.

(10) Patent No.: US 7,363,464 B2
(45) Date of Patent: *Apr. 22, 2008

(54) APPARATUS AND METHOD FOR REDUCTION OF PROCESSOR POWER CONSUMPTION

(75) Inventors: Oded Liron, Givat-Ada (IL); Uri Frank, Beit-Itzhak-Shaar Hefor (IL)

(73) Assignee: Intel Corporation, Santa Clara, CA (US)

( * ) Notice: Subject to any disclaimer, the term of this patent is extended or adjusted under 35 U.S.C. 154(b) by 497 days.

This patent is subject to a terminal disclaimer.

(21) Appl. No.: 11/047,927

(22) Filed: Jan. 31, 2005

(65) Prior Publication Data

US 2005/0216697 A1 Sep. 29, 2005

Related U.S. Application Data

(63) Continuation of application No. 10/328,632, filed on Dec. 23, 2002, now Pat. No. 6,922,769.

(51) Int. Cl.
*G06F 12/08* (2006.01)

(52) U.S. Cl. ...................................... 711/208

(58) Field of Classification Search ................ 711/200, 711/208; 713/324; 71/200, 208
See application file for complete search history.

(56) References Cited

U.S. PATENT DOCUMENTS

| 5,768,610 | A | 6/1998 | Pflum |
| 6,189,068 | B1 | 2/2001 | Witt et al. |
| 6,463,517 | B1 | 10/2002 | McGrath |
| 2001/0037421 | A1 | 11/2001 | Singh et al. |

*Primary Examiner*—Kevin L. Ellis
(74) *Attorney, Agent, or Firm*—Blakely, Sokoloff, Taylor & Zafman LLP

(57) ABSTRACT

A method and apparatus for an apparatus and method for reduction of power consumption in OS that use flat segmentation memory model are described. In one embodiment, the method includes monitoring a segment register to detect a segment register update operation. Once the segment register update operation is detected, a code/data segment contained within the segment register is identified as one of a segmented code/data segment and a flat code/data segment. Once detected, the segment register is updated according to whether the segment is flat or segmented. Accordingly, when a segment register read is performed, one or more updated bits within the segment register are used to identify the code/data read from the segment register as either flat or segmented.

33 Claims, 12 Drawing Sheets

APPARATUS AND METHOD FOR REDUCTION OF PROCESSOR POWER CONSUMPTION

RELATED APPLICATIONS

This application is a continuation application of U.S. application Ser. No. 10/328,632, filed Dec. 23, 2002, now U.S. Pat. No. 6,922,769.

FIELD OF THE INVENTION

One or more embodiments of the invention relate generally to the field of integrated circuit and computer system design. More particularly, one embodiment of the invention relates to an apparatus and method for reduction of processor power consumption when an Operating System (OS) uses a flat segmentation memory model.

BACKGROUND OF THE INVENTION

Communications between devices within a computer system are typically performed using one or more buses that interconnect such devices. These buses may be dedicated buses coupling two devices or non-dedicated buses that are multiplexed by a number of units and devices (e.g., bus agents). Moreover, buses within a computer system may be dedicated to transfer a specific type of information. For example, the x86 microprocessor architecture developed by Intel Corporation of Santa Clara, Calif., includes a three bus system with address, data and control buses for respectively transferring address, data and control signals.

In computer systems employing advanced architectures and processors, such as Pentium®Pro, Pentium®II, Pentium®III or Pentium®4 processors, bus transactions typically occur in a pipelined manner. Separate data and address buses facilitate the pipelining of bus transactions. Specifically, the next memory access may start after a previous transaction request is issued; and all components or phases of a bus transaction are not required to complete before another bus transaction may be initiated. Accordingly, requests from numerous bus agents may be pending at any one time.

Accordingly, as indicated above, a vast amount of research, as well as system architecture design, has been directed to increasing data throughput within computer systems. In addition, technologies such as, data pipelining, out-of-order execution, and the like, have helped to provide advanced architectures and processing with significantly higher clock rates and improved performance. Furthermore, this research, as well as architecture redesign, has helped to provide a mobile market for laptop computers, hand held devices, personal digital assistants (PDAs), and the like.

Unfortunately, such mobile platforms are limited to a run time dictated by the life of a battery used by the respective platform. Accordingly, depending on the complexity of the mobile platform, the respective mobile platform can deplete power resources from an attached battery within a relatively short amount of time. In part, this is due to the fact that many of the electronic elements of the platform continue to consume power when they are not being used.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for reduction of power consumption when an operating system (OS) uses a flat segmentation memory model are described. In one embodiment, the method includes monitoring a segment register to detect a segment register update operation. Once the segment register update operation is detected, a code/data segment contained therein, is identified as one of a segmented segment and a flat segment. Once identified, the segment register is updated according to the whether the segment is identified as a flat segment or a segmented segment. Accordingly, when a segment register read is performed, one or more bits within the segment register are used identify the code/data segment contained therein as either flat or segmented.

In the following description, for the purposes of explanation, numerous specific details are set forth in order to provide a thorough understanding of the embodiments of the present invention. It will be apparent, however, to one skilled in the art that the various embodiments of the present invention may be practiced without some of these specific details. In addition, the following description provides examples, and the accompanying drawings show various examples for the purposes of illustration, rather than to provide an exhaustive list of all possible implementations of the embodiments of the present invention. In other instances, well-known structures and devices are shown in block diagram form in order to avoid obscuring the details of the various embodiments of the present invention.

System Architecture

Figure 1:
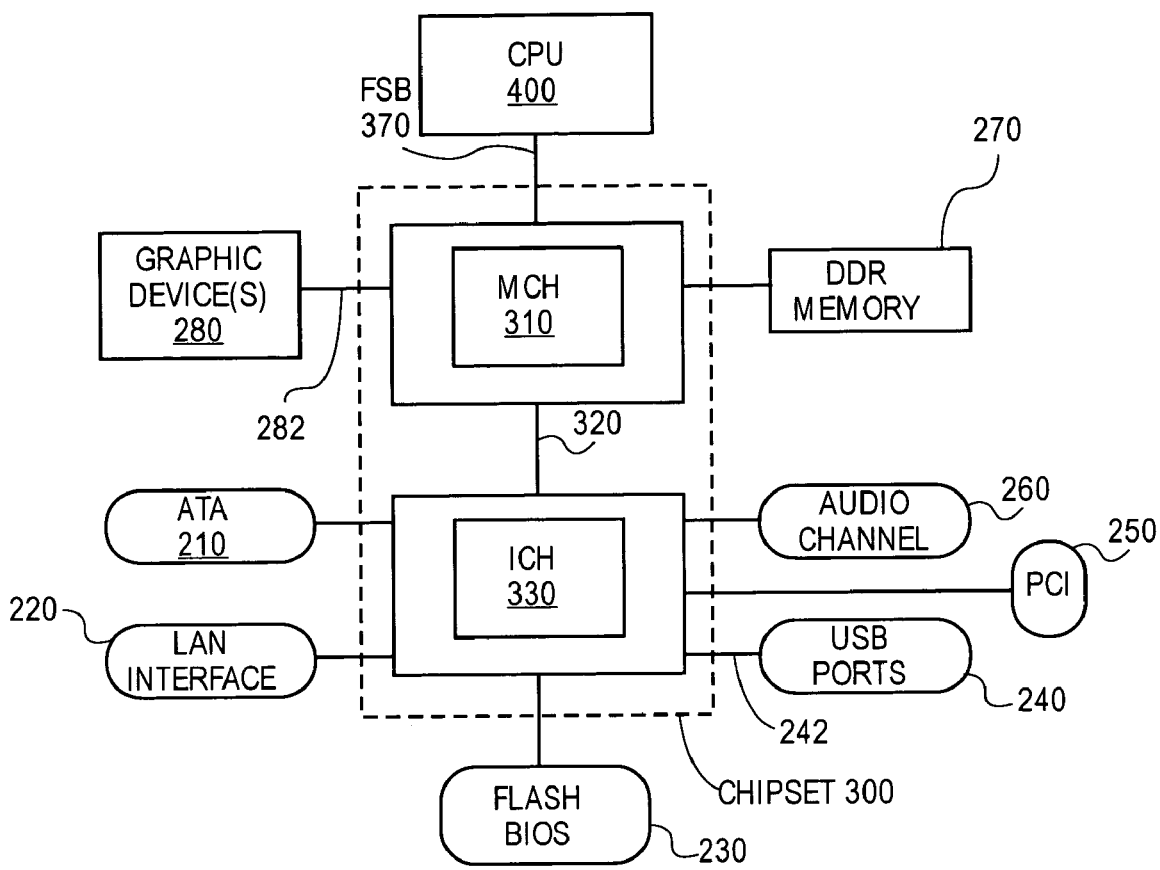
FIG. 1 is a block diagram illustrating a mobile platform computer system in accordance with one embodiment of the present invention.

Referring now to FIG. 1, a processor (CPU) 400 of one embodiment is described. For the embodiment shown in FIG. 1, the CPU 400 is a mobile platform CPU such as, for example, a processor currently referred to as a BANIAS processor from Intel Corporation of Santa Clara, Calif. It will be appreciated that, for other embodiments, the CPU 400 may be a different type of processor including, for example, another type of microprocessor, a digital signal processor, a graphics processor, an embedded processor, etc.

Accordingly, one embodiment of the present invention provides a uni-processor computer system 100 utilizing a mobile platform chipset 300, for example, as depicted with reference to FIG. 1. As described herein, the term "chipset" is used in a manner well-known to those of ordinary skill in the art to describe, collectively, the various devices coupled to the CPU 400 to perform desired system functionality. However, embodiments of the present invention may be utilized within multi-processor systems, as well as non-mobile platform devices such as server based systems. As illustrated, the mobile platform chipset is comprised of a memory controller hub (MCH) 310 and an input/output (I/O) controller hub (ICH) 330 coupled together utilizing bus 320. In addition, the chipset 300 is coupled to mobile platform CPU 400 via a front side bus (FSB) 370.

Figure 2:
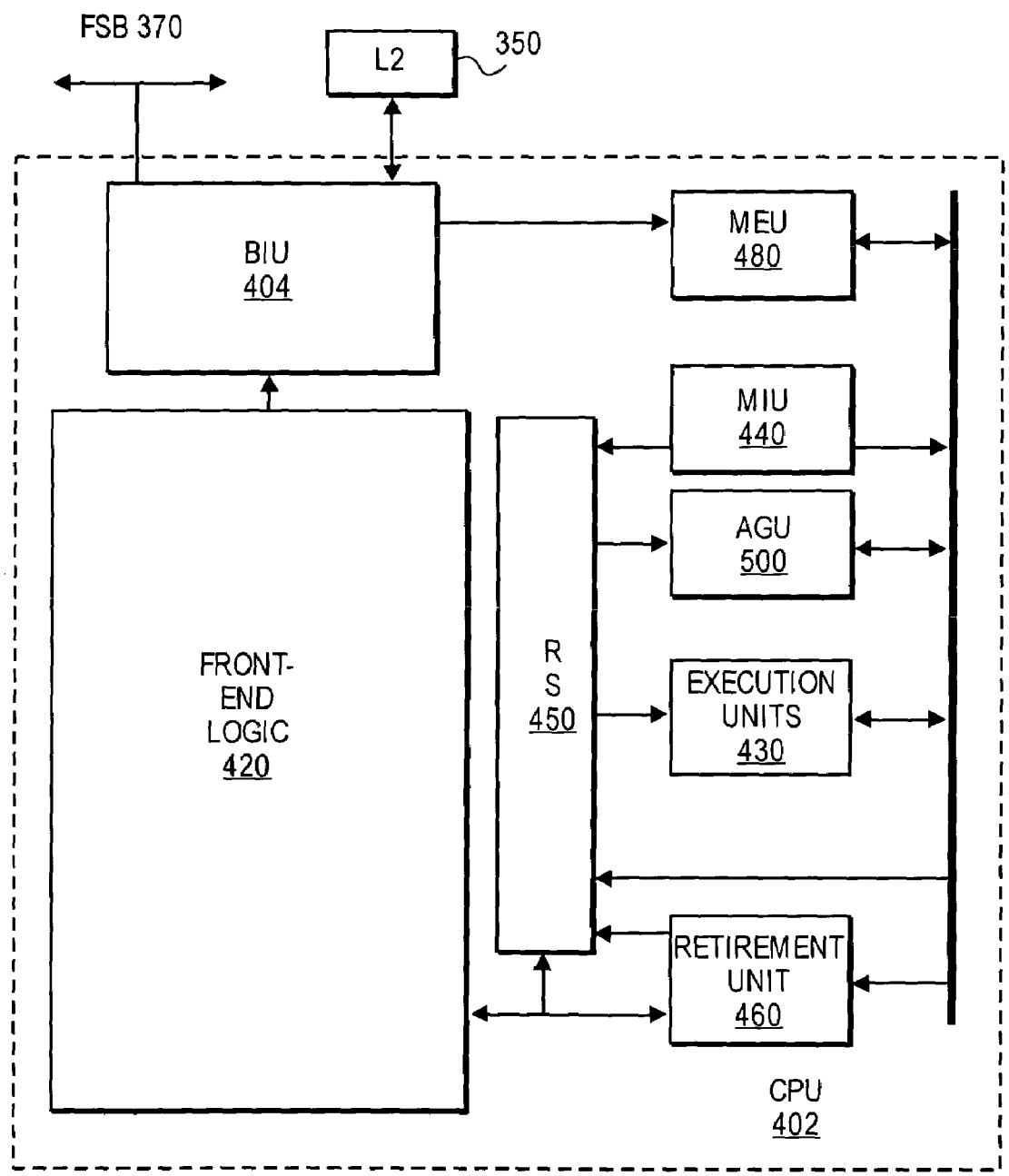
FIG. 2 is a block diagram further illustrating the mobile platform CPU as depicted in FIG. 1 in accordance with one embodiment of the present invention.

In the embodiment depicted, computer system 300 includes one DDR memory channel 270, as well as Graphics Device(s) 280. Likewise ICH 330 is coupled to various I/O devices including audio channels 260, PCI devices 250, USB ports 240, ATA attachments 210 and LAN interface 220. However, FIG. 2 is depicted to provide one possible embodiment of a mobile platform chipset computer system 100. Furthermore, computer system 100 may be utilized within server computers.

FIG. 2 is a block diagram further illustrating the CPU 400, as depicted in FIG. 1, in accordance with one embodiment of the present invention. In one embodiment, CPU 400 is configured to perform "Dynamic Execution". As described herein, Dynamic Execution refers to the use of front end logic to fetch the next instructions, according to a program order, and prepare the instructions for subsequent execution in the system pipeline.

As illustrated, the front-end logic 420 fetches the upcoming program instructions for execution and prepares the instructions for future use within the system pipeline. In effect, the front-end logic 420 supplies a high bandwidth stream of decoded instructions to the out-of-order engine (reservation station (RS) 450), which directs execution (the actual completion) of the instructions. However, in order to execute the instructions in the most efficient fashion, the front-end logic 420 utilizes highly accurate branch prediction logic received from retirement unit 460 in order to speculate where the program is going to execute next, which is referred to herein, as "Dynamic Execution."

Accordingly, once the instruction address is predicted, the front-end logic 420 fetch instruction bytes from the level two cache (L2) 350. Once the instructions are fetched, the instructions are decoded into basic operations, referred to herein as micro-operations (uOPs), which the execution units 430 execute. The RS 450 has several buffers that are utilized to reorder the flow of instructions in order to optimize performance as the reordered instructions flow down the system pipeline in preparation for execution scheduling. In effect, the instructions are aggressively reordered to allow the instructions to execute as quickly as their input operands are ready.

Figure 3:
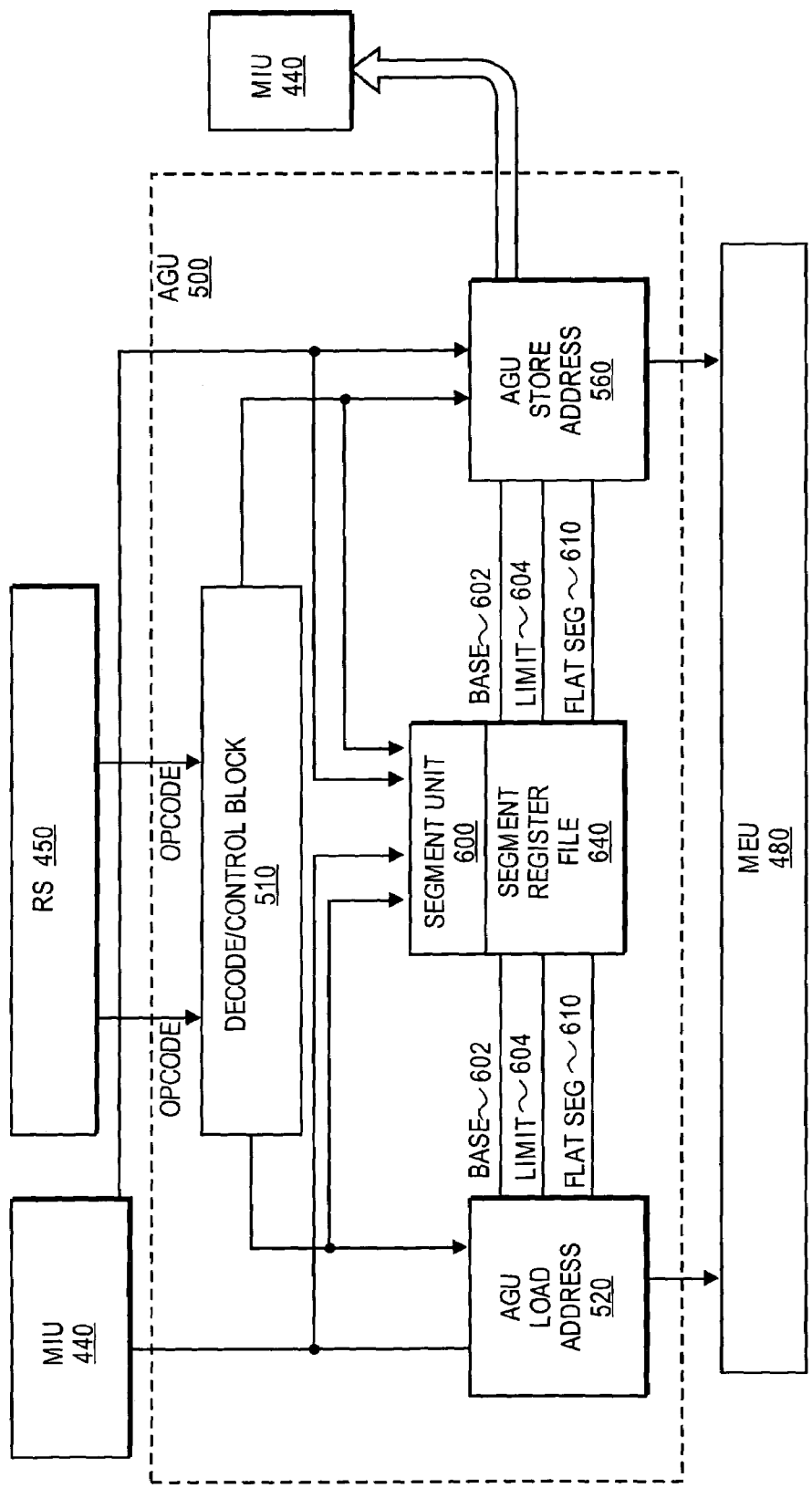
FIG. 3 is a block diagram further illustrating an address generation unit as depicted in FIG. 2 in accordance with one embodiment of the present invention.

As part of the Dynamic Execution, RS 450 utilizes an address generation unit (AGU) 500. In one embodiment, AGU 500 is used to generate a linear address, as well as an effective address for segment data contained within a segment register file (as shown in FIG. 3). In one embodiment, AGU 500 is required, since computer system 100, as shown in FIG. 1, may operate according to a segmentation memory model or a flat segmentation memory model.

As known to those skilled in the art, the segmentation memory model uses a memory organization methodology where memory appears as a group of independent address spaces (segments) to devices which access memory. Segments are defined by a base address (a start location at the segment in memory), as well as an end location (limit) of the segment within memory. In contrast, within a flat-segmentation (non-segmented) memory model, loading/storage of data/instructions is not confined to memory segments, and may generally occur within the available physical address space.

Within a segmented memory, to address a byte within a memory segment, a program issues a logical address which consists of a segment selector and an offset. The segment selector identifies the segment to be accessed and the offset identifies a byte in the address space of the segment. Accordingly, source and destination operands in memory are referenced by segment selector and offset. The segment selector specifies the segment containing the operand and the offset (number of bytes from the beginning of the segment to the first byte of the offset) specifies the effective address of the operand.

Alternatively, a linear address (linear address=segment base+effective address) may be specified. The linear address is generally calculated by the following equation:

$$\text{linear\_addr} = \text{segment\_base} + \text{base\_reg} + \text{index\_reg} * \text{scale} + \text{displacement} \quad (1)$$

An effective address represents an offset into the segment's space which is used for checking the validity of the access operations and is compared against the segment limit value (limit) to determine a segment limit violation (whether the effective address exceeds the segment limit address). An effective address is generally calculated according to the following equation:

$$\text{effective\_addr} = \text{base\_reg} + \text{index\_reg} * \text{scale} + \text{displacement} \quad (2)$$

Accordingly, AGU 500 is responsible for generating an effective address and a linear address for segment data associated with executed micro-operations. Furthermore, AGU 500 is also responsible for verifying that the effective address does not exceed a segment limit. However, in some operating systems such as Windows NT40, Windows 2000, Windows-XP, Linux, UNIX or the like, the operating system (OS) does not (or rarely) uses a segmented memory model.

As a result, many current operating systems bypass the segmentation memory model available from such computer systems and use a flat segmentation (non-segmented) memory model. Unfortunately, conventional AGUs simply treat flat-segments as any other segments and perform calculations of both a linear address (LA) and effective address (EA), as well as checking for segment limit violations. Accordingly, one embodiment of the present invention provides an AGU, for example, as illustrated in FIG. 3 that identifies whether code/data segments are either flat segments or segmented segments.

FIG. 3 is a block diagram illustrating AGU 500 as depicted in FIG. 2 in accordance with one embodiment of the present invention. As illustrated, AGU 500 receives opcodes from RS 450 which are decoded at block 510. Furthermore, additional information is received from memory interface unit (MIU) 440. In one embodiment, AGU 500 includes segment unit 600, which is responsible for detecting a segment register update operation. As described herein, a segment register update operation refers to, for example, an update by the OS of information within the segment register file (not shown) contained within segment unit 600.

Generally, the segment register file includes a predetermined portion describing a base (start) address of the segment (base) within memory, as well as a predetermined portion describing a limit portion (stop address) of the segment (limit) within memory. However, in contrast with conventional segment units, segment unit 600 generates a flat segment control bit (FLAT SEG) 610, as depicted with reference to FIG. 3. Accordingly, in addition to providing a base value (BASE) 602, as well as the limit value (LIMIT) 604 of an update segment, segment unit 600 provides FLAT SEG control bit 610.

In one embodiment, FLAT SEG control bit 610 is utilized by the various AGUs (520 and 560) to determine whether a code/data segment contained within the segment register is either a flat segment or a segmented segment. In other words, when FLAT SEG control bit 610 is set, AGUs 520 and 560 disable a clock input to effective address calculation logic (not shown), as well as segment limit violation logic (not shown). As a result, AGU 500 consumes a significantly reduced amount of power as compared to conventional AGUs. In other words, when a flat segment is detected, the linear address is equal to the effective address of the segment, which is then provided to memory execution unit (MEU) 480.

As a result, the effective address calculation, as well as segment limit calculations are no longer required. In other words, high powered adders for calculating effective addresses, as well as dynamic carry chain logic for calculating limit violations for segmented segments may be disabled when processing flat segments. In a further embodiment, AGUs 520 and 560 also disable effective address calculation for conditional direct branches. In other words, when a code segment indicating a conditional branch is a flat segment, calculation of the offset is redundant and can be avoided (i.e., the base is guaranteed to be zero, thus the offset can be used directly as a branch target).

Figure 4:
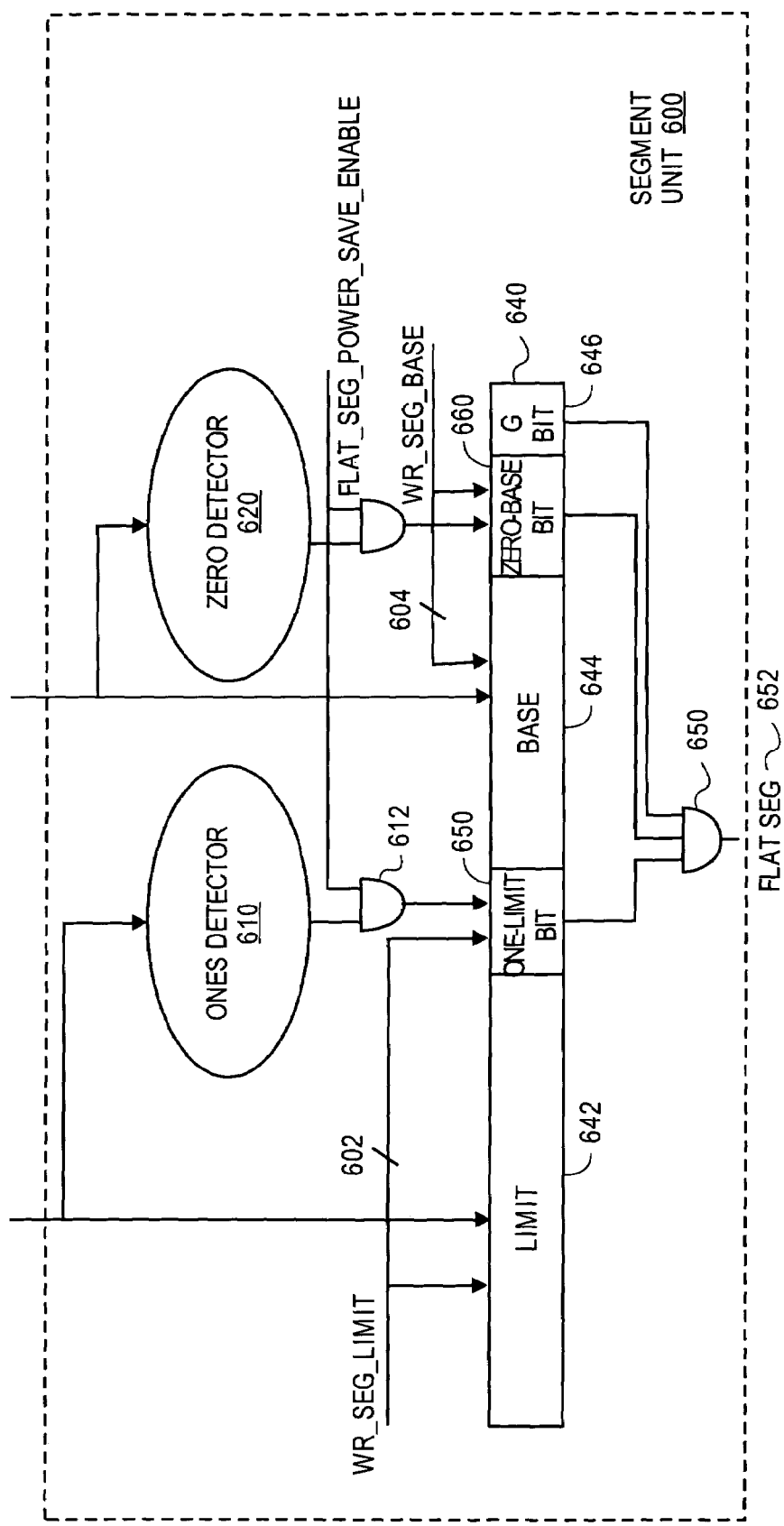
FIG. 4 is a block diagram further illustrating the segment unit as depicted in FIG. 3 in accordance with one embodiment of the present invention.

FIG. 4 is a block diagram further illustrating segment unit 600, as depicted in FIG. 3, in accordance with one embodiment of the present invention. As illustrated, segment unit 600 includes segment register file 640. As illustrated, each data/code segment accessed by a micro-operation includes, for example, a 32-bit segment base address (base) 644, as well as, for example, a 20-bit segment limit (LIMIT) 642 of the segment, as described above. In addition, various attribute bits such as, for example, access rights to the segment are also included in addition to a segment granularity (G-BIT) 646. In one embodiment, the granularity bit marks the units which the limit is calculated.

For example, when a G-BIT is "zero," the segment limit is calculated in byte units. However, when the G-BIT is set to "one" the segment unit is calculated in 4-kilobytes units. Conversely, when a current OS uses a flat segmentation memory model, data, associated with various micro instructions (code/data segment) is deemed a flat segment when it has a base of zero and a limit of, for example, 4 gigabytes (FFFFF). Accordingly, one embodiment of the present invention increases the segment register file 640 by adding a ONE-LIMIT BIT 650, as well as a ZERO-BASE BIT 660 to the segment register file 640.

Accordingly, as depicted, when a segment register update operation is detected, the operation generally occurs in two phases. During a first phase the segment base is updated as indicated by a flag (WR_SEG_BASE) 604. As such, when the flag 604 is detected, the output from Zero detector 620 is used to set ZERO-BASE BIT 660. In other words, when a code/data segment is a flat segment, BASE 644 should contain all "zeros". As such, in one embodiment, Zero detector 620 will detect such an occurrence, such that once the flag 520 is asserted, ZERO-BASE BIT 660 is set accordingly.

During a second phase of the segment register update operation, a flag (WR_SEG_LIMIT) 602 is asserted. Once asserted, Ones detector 610 is utilized to set ONE-LIMIT BIT 650. In other words, when a code/data segment is a flat segment, LIMIT 642 should contain all "1" values, which is indicated by Ones detector 610. Hence, when LIMIT 642 contains all "1" values, ONE-LIMIT BIT 650 is set to a value of "one." Accordingly, in one embodiment, segmentation unit 600 uses conditional logic to generate the FLAT SEG signal 610.

In one embodiment, when ONE-LIMIT BIT 650 is set, ZERO-BASE BIT 660 is set, and G-BIT 640 is set, a code/data segment contained within segment register file 640 is identified as a flat segment using logical AND gate 650. However, those skilled in the art will recognize that various logic may be used for generation of FLAT SEG signal 652. Consequently, the address generation units 500 (FIGS. 2 and 3) may save power by disabling its effective address calculation logic, as well as its segment limit calculation logic, by disabling clock inputs thereto.

Referring again to FIG. 2, as a result of the out-of-order or Dynamic Execution, retirement unit 460 is utilized to reorder instructions executed in an out-of-order manner, back into their original program order. The retirement unit 460 receives the completion status of executed instructions from the execution units 430 and processes the results so that a proper architectural state is committed (or retired) according to the program order. However, in order to properly retire an instruction, retirement unit 460 and, specifically, the retirement unit 460 is required to determine whether the code segment effective address is within a corresponding segment limit.

Accordingly, in one embodiment, upon a code segment register write to AGU 500, AGU 500 detects whether the code segment is flat or segmented, and updates a copy of the code segment in, for example, a reorder buffer (ROB) 470 of retirement unit 460. Alternatively, a FLAT SEG bit is provided to the retirement unit 460, such that segment limit violation logic within the retirement unit 460 is disabled when associated code segments are flat segments. This power saving technique is particularly advantageous in one embodiment, wherein the retirement unit 460 can retire up to three micro-operations per clock cycle. As such, a chain of various micro-operations does not need to be analyzed to determine segment limit violations (using, for example, dynamic carry chain logic) when the micro-operations reference flat code segments. Procedural methods for implement embodiments of the present invention are now described.

Operation

Figure 5:
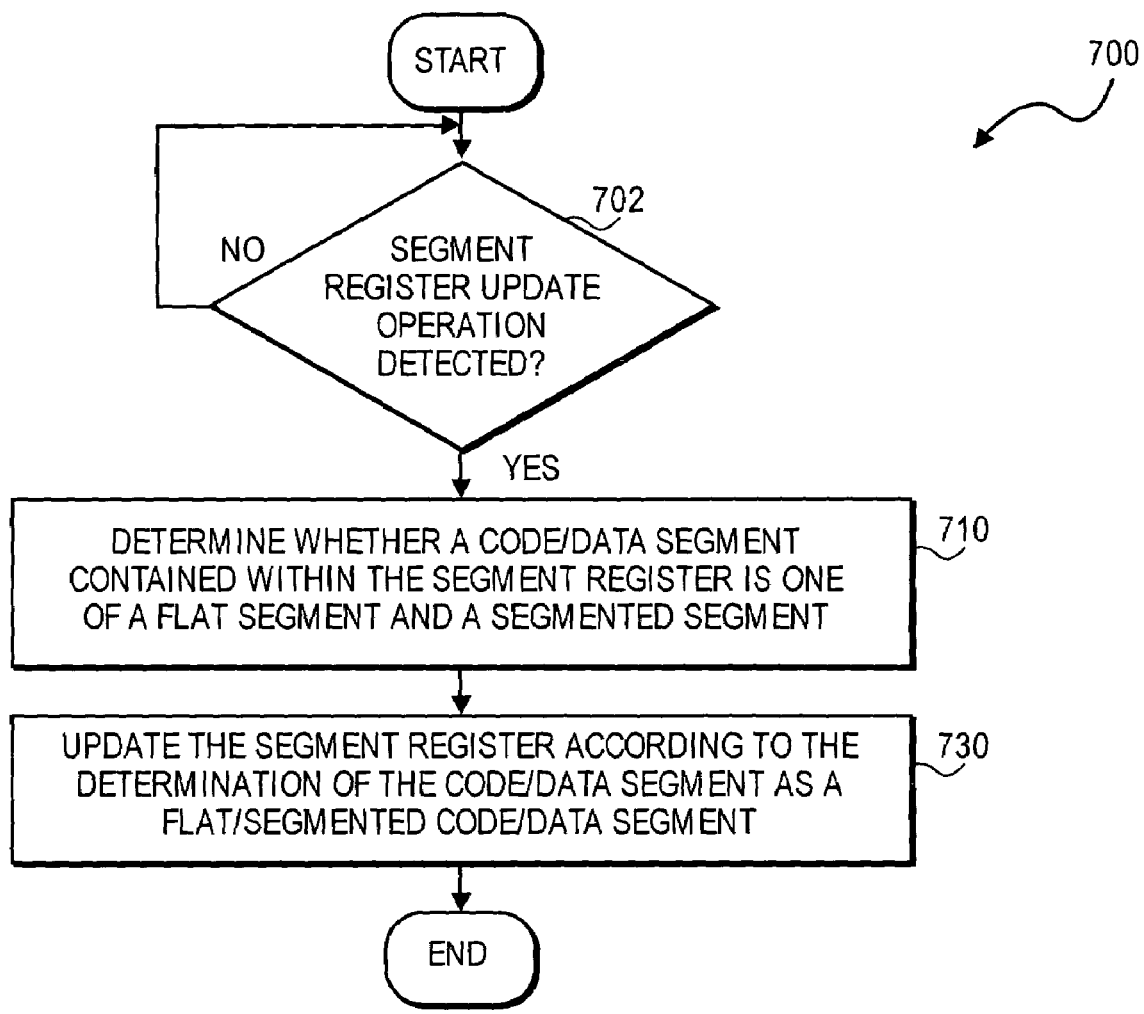
FIG. 5 is a flow chart illustrating a method for detecting an operating system memory model, as one of a segmented memory model and a flat segmentation memory model in accordance with one embodiment of the present invention.

FIG. 5 is a flow chart illustrating a method for setting one or more predetermined bits within a segment register according to whether a code/data segment is identified a flat code/data segment or a segmented code/data segment in accordance with one embodiment of the present invention. In one embodiment, the method 700 depicts operations performed by, for example, segment unit 600, as depicted in FIGS. 3 and 4. As indicated above, a determination of whether code/data segment is either flat or segmented is performed by segment unit 600. This determination is used, according to embodiments of the present invention, to disable logic required to generate effective addresses, as well as segment limit violations associated with segmented memory models.

Referring again to FIG. 5, at process block 702 it is determined whether a segment register update operation is detected. During a segment register update operation, a segment register file, for example, as depicted in FIG. 5 is updated with a base value associated with a code/data segment, as well as a limit value associated with the code/data segment. Once the update is detected, at process block 710 a code/data segment contained within the segment register is identified as either a segmented code/data or a flat code/data segment. Once the code/data segment is identified at process block 730, the segment register is updated according to whether the segment is flat or segmented.

Figure 6:
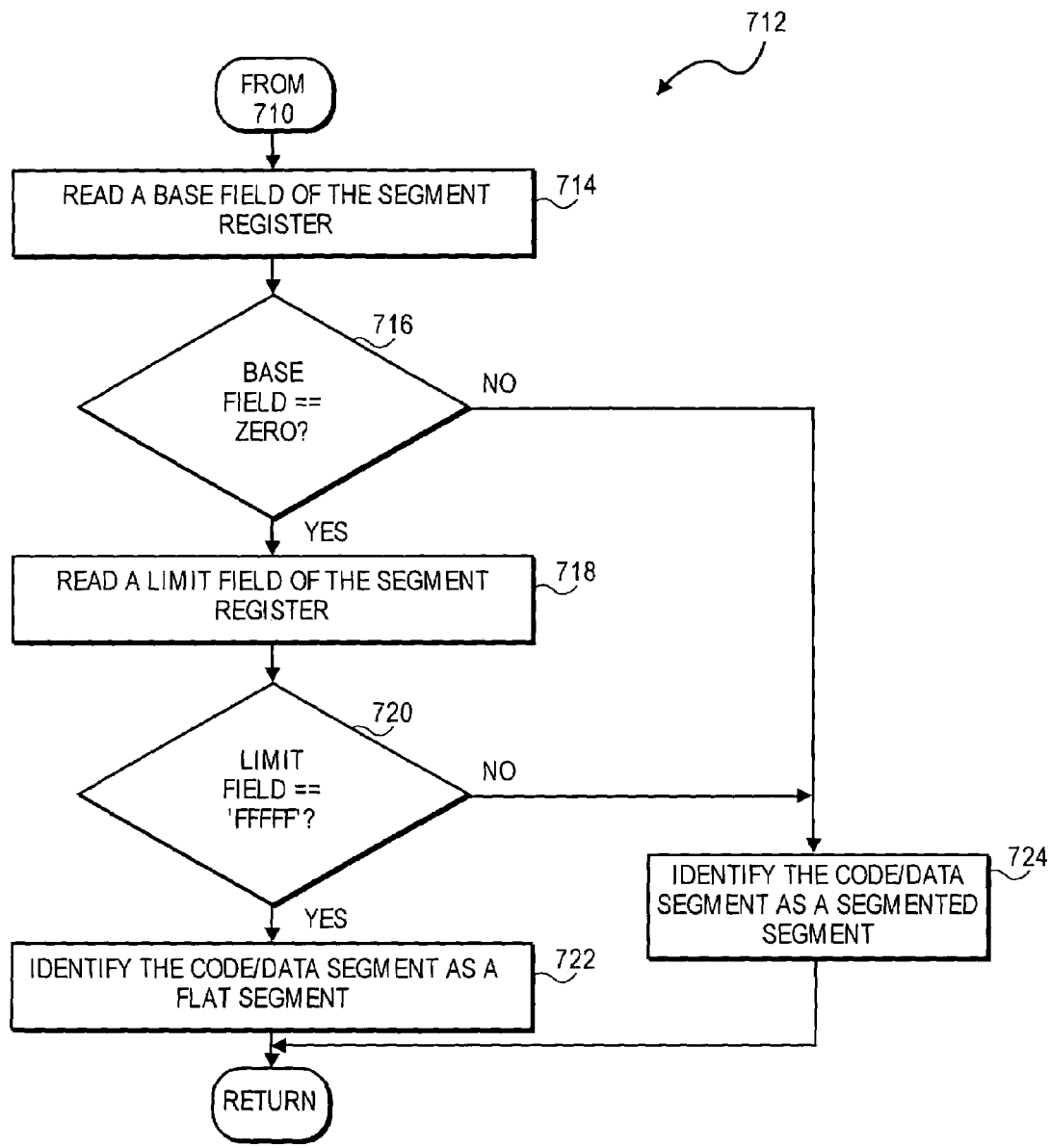
FIG. 6 is a flow chart illustrating a method for determining the operating system memory model according to contents of a segment register file in accordance with one embodiment of the present invention.

FIG. 6 is a flow chart illustrating a method 712 for determining the code/data segment as flat/segmented of process block 710, as depicted in FIG. 5 in accordance with one embodiment of the present invention. At process block 714 a base field of the segment register file is read. Once read, at process block 716 it is determined whether contents of the base field equals zero. For example, in one embodiment, the base field is a 32-bit value which generally indicates a starting location of the segment within memory when memory is configured according to a segment memory model.

However, when memory is configured according to a flat segmentation memory model, the base location of the segment is zero since the memory does not contain various codes/data segments as provided according to a segmented memory model. Next, when contents of the base field equals zero, at process block 718 a LIMIT of the segment register is read. In one embodiment, the LIMIT of the segment register represents a 20-bit value indicating a maximum size of the segment. However, when a flat segmentation memory model is utilized, the size of the segment is by default a maximum value, which in one embodiment, equals a hexadecimal value of "FFF."

Accordingly, at process block 720 it is determined whether contents of the limit value equal a value of "FFFFF." In other words, if each bit position within the LIMIT equals one, and each bit position within the base field equals zero, the code/data segment is identified as a flat segment, as illustrated at process block 722. Otherwise at process block 724, the code/data segment is identified as a segmented code/data segment.

Figure 8:
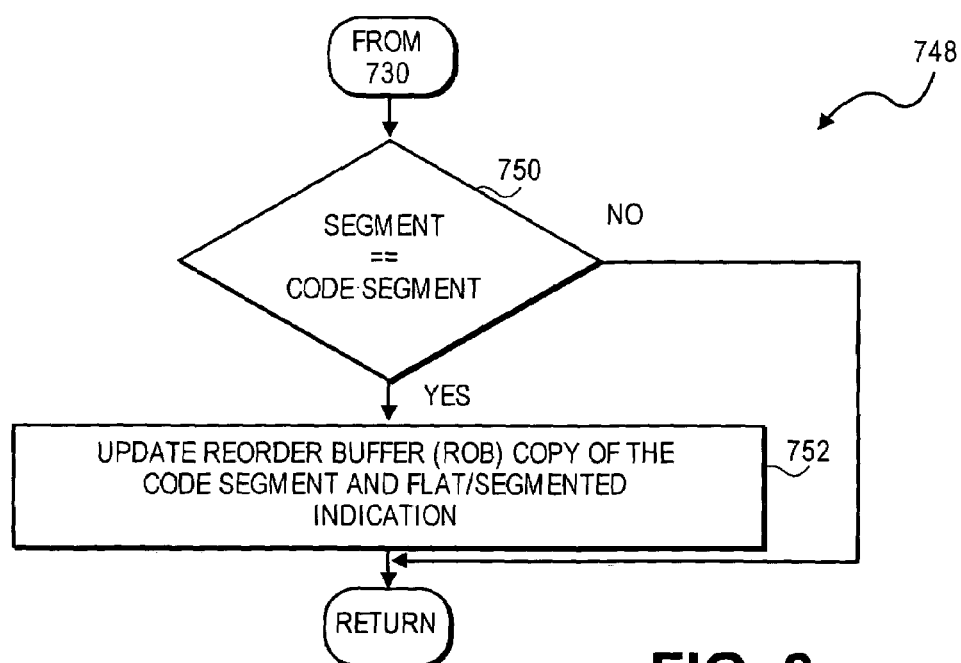
FIG. 8 is a flow chart illustrating a method for updating a reorder buffer following a segment register update operation of a code segment in accordance with one embodiment of the present invention.

In order to avoid comparisons of the base field, as well as the LIMIT during each segment register read operation, FIG. 8 illustrates a flow chart depicting a method 732 for setting one or more predetermined bit positions within the segment register file to indicate whether the code/data segment is a flat segment or a segmented segment.

Accordingly, at process block 734 a first predetermined bit within the segment register file is selected. In one embodiment, the first predetermined bit refers to ZERO-BASE BIT. Once selected, at process block 736 the selected bit is set according to contents of the base field of the segment register. In other words, if each bit position within the base field is set to zero, the data/code segment within the segment register is very likely a flat segment. Next, at process block 738 a second predetermined bit position within the segment register file is selected. In one embodiment, the second predetermined bit refers to a ONE-LIMIT BIT.

Figure 7:
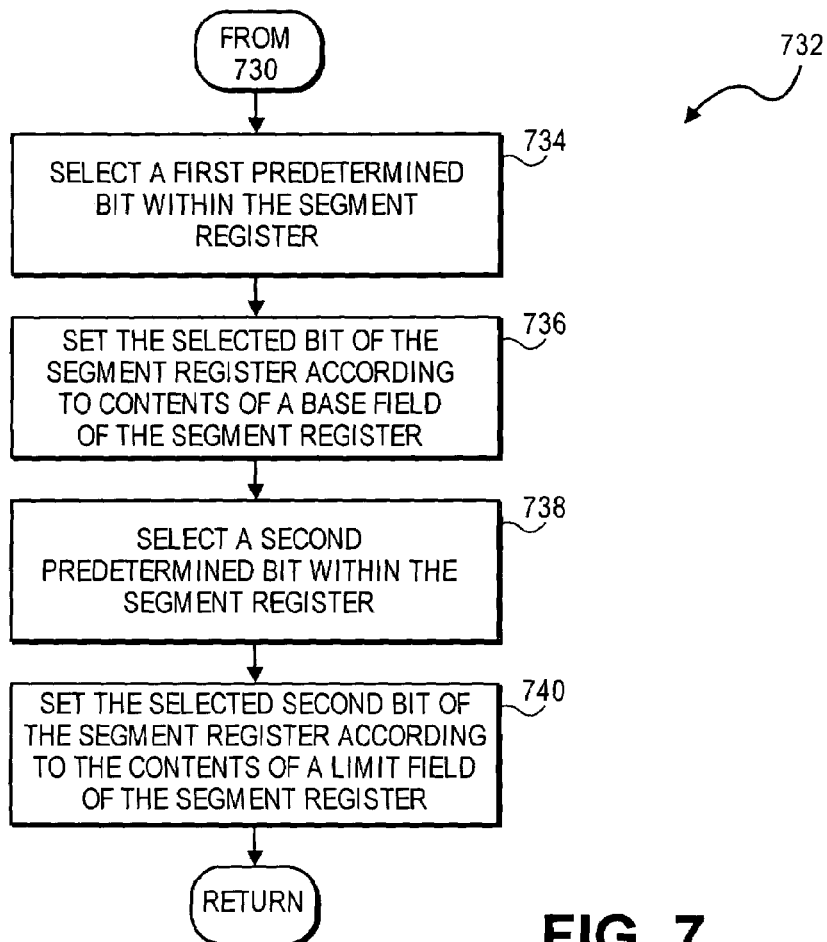
FIG. 7 is a flow chart illustrating a method for updating a segment register file according to the determined operating system memory model in accordance with one embodiment of the present invention.

Finally, at process block 740 the second selected bit of the segment register is set according to contents of the LIMIT of the segment register. In other words, when each bit position within the LIMIT of the segment register is set to one, a ONE-LIMIT BIT of the segment register file is set to one. According to the embodiment depicted with reference to FIG. 7, a segment register update operation is depicted as requiring two phases: a base field update phase, and a LIMIT update phase. In an alternative embodiment, updating of the segment register file within a single phase would require setting a single bit depending on the contents of the base field and LIMIT of the segment register.

FIG. 8 is a flow chart illustrating a method 748 for updating a reorder buffer (ROB) following update of the segment register at process block 730, as depicted in FIG. 5, in accordance with one embodiment of the present invention. Accordingly, at process block 750 it is determined whether the segment updated by the segment register update operation is a code segment. When a code segment is detected, in one embodiment, at process block 752, the ROB is updated with a copy of the code segment, as well as an indication of whether the updated code segment is either a flat segment or a segmented segment.

Figure 9:
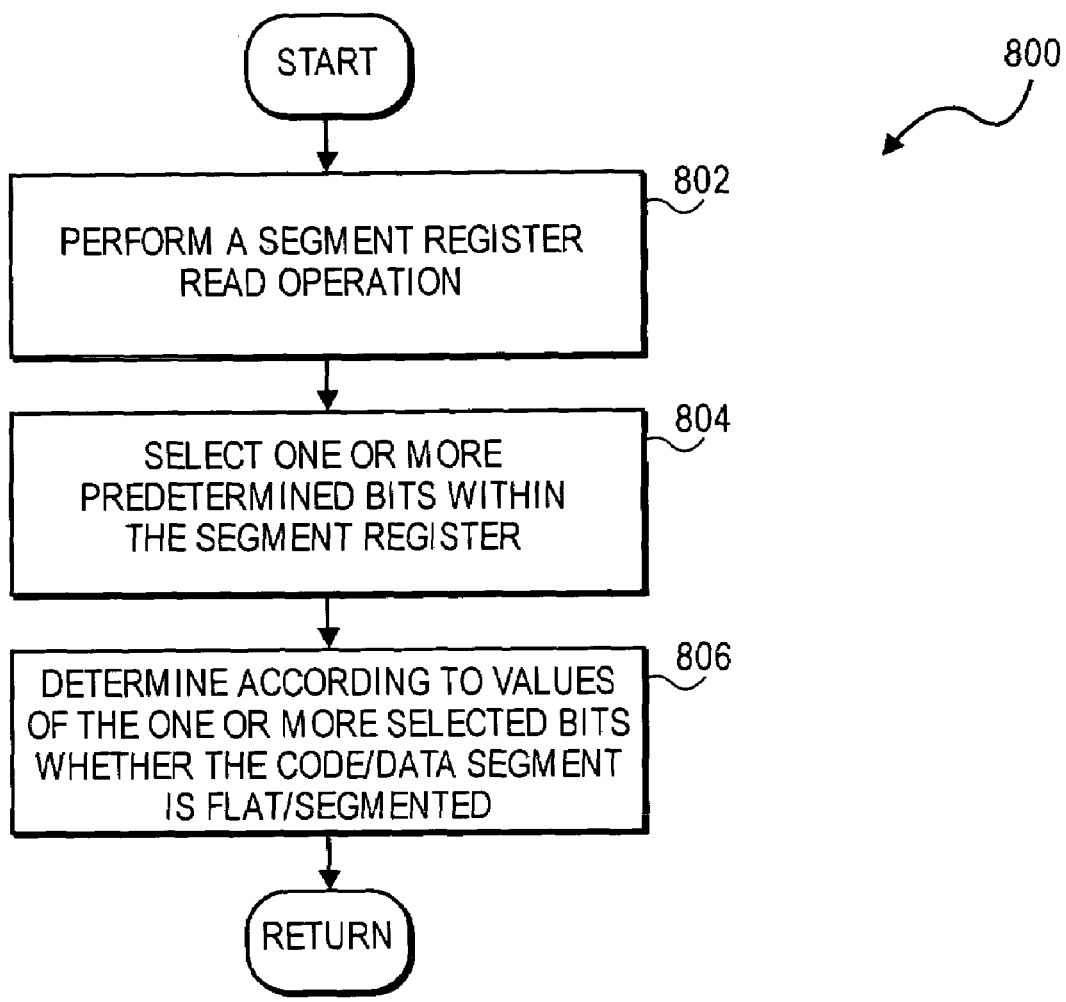
FIG. 9 is a flow chart illustrating a method for determining an operating system memory model following a segment register read operation in accordance with one embodiment of the present invention.

FIG. 9 is a flow chart illustrating a method 800 for identifying segmentation of the code/data segment according to one or more predetermined bits within a segment register in accordance with one embodiment of the present invention. Accordingly, at process block 802 a segment register read operation is performed. In general, a segment register read operation is performed when contents of a segment register are required. For example, as depicted with reference to FIG. 4, the RS 450 provides a 5-bit value of a segment register ID which is used to perform a read of the contents of the indexed segment register within the segment register file. Generally a segment register read is a frequent event that occurs for every load or store operation. Likewise, the segment register read operation is common within retirement units during retirement of micro-operations.

Once the segment register read is performed at process block 804, one or more predetermined bits within the segment register are selected. In one embodiment, the one or more predetermined bits refer to a ONE-LIMIT BIT, a ZERO-BASE BIT 640 and a G-BIT 646. In an alternative embodiment, a flat segment signal is generated from the aforementioned values and provided along with the segment field and LIMIT of the segment register from a segment unit. Finally, at process block 806 the segment is identified as either flat or segmented according to values of the one or more selected, predetermined bits. Alternatively, the identification is determined according to whether the flat segment signal is asserted or deasserted.

Figure 10:
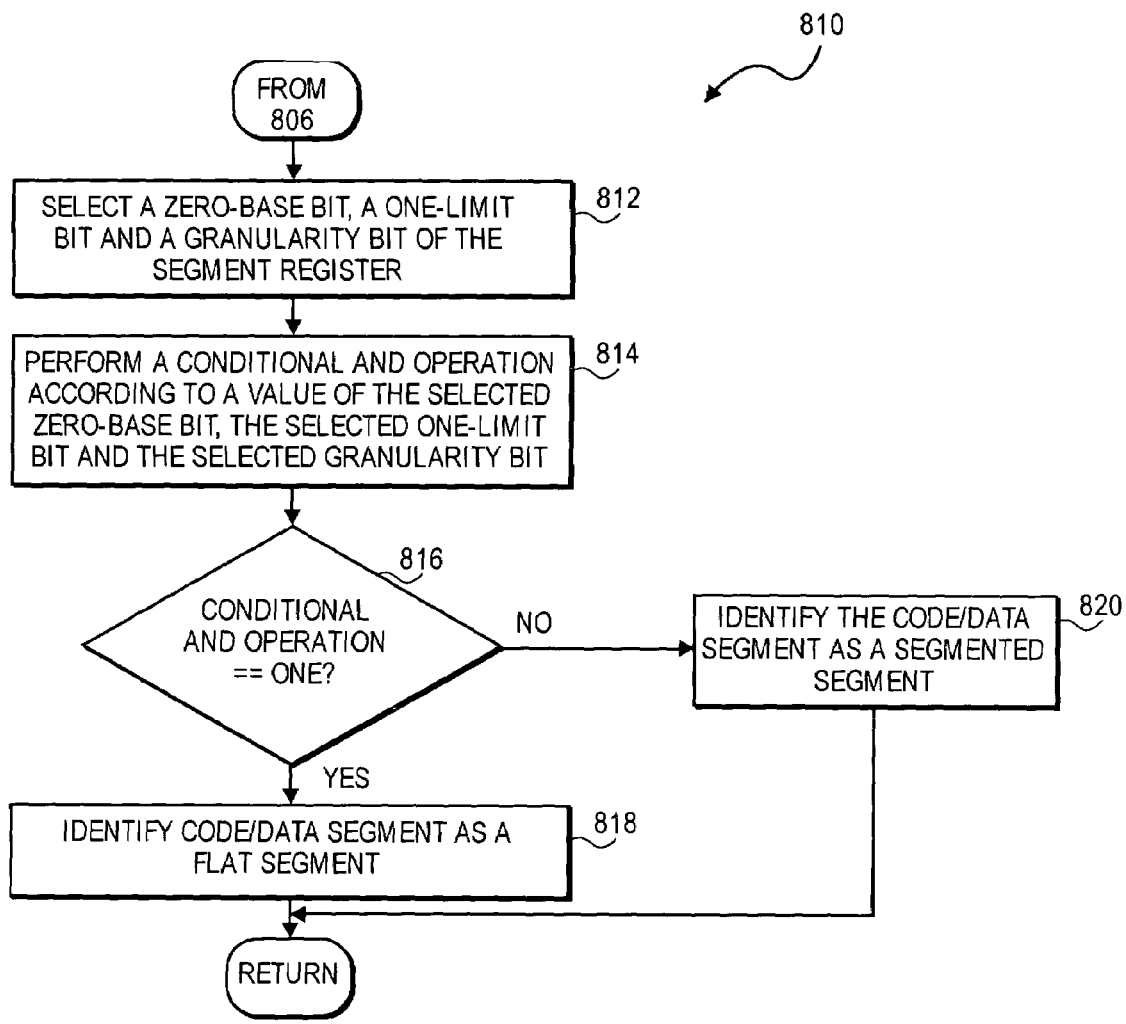
FIG. 10 is a flow chart illustrating a method for identifying an operating system memory model according to one or more predetermined bits within the segment register file in accordance with one embodiment of the present invention.

FIG. 10 is a flow chart illustrating a method 810 for determining the segmentation detection of process block 806, as depicted in FIG. 9, in accordance with one embodiment. At process block 812 a ZERO-BASE BIT, a ONE-LIMIT BIT and a G-BIT of the segment register are selected. In one embodiment, the granularity bit of the segment register refers to units with which the limit is counted. For example, if the G-BIT is set to zero, the segment limit is counted in byte units. However, when the G-BIT is set to a value of one, the segment limit is counted in 4-kilobyte units. However, when OS memory is configured according to a flat segmentation memory model, the granularity bit is generally set.

Accordingly, at process block 814, a conditional AND operation is performed with inputs as ZERO-BASE BIT 660, the ONE-LIMIT BIT 650 and G-BIT 646 to form flat segment signal 652. Accordingly, at process block 816 when the result of the logical AND operation is one, process block 818 is performed. In other words, process block 816 is checking to determining whether the flat segment signal is asserted, such that assertion indicates a flat segment. Accordingly, at process block 818, the segment is identified as a flat segment, when the result of the conditional AND operation is one. Otherwise, at process block 820 the segment is identified as a segmented segment.

Figure 11:
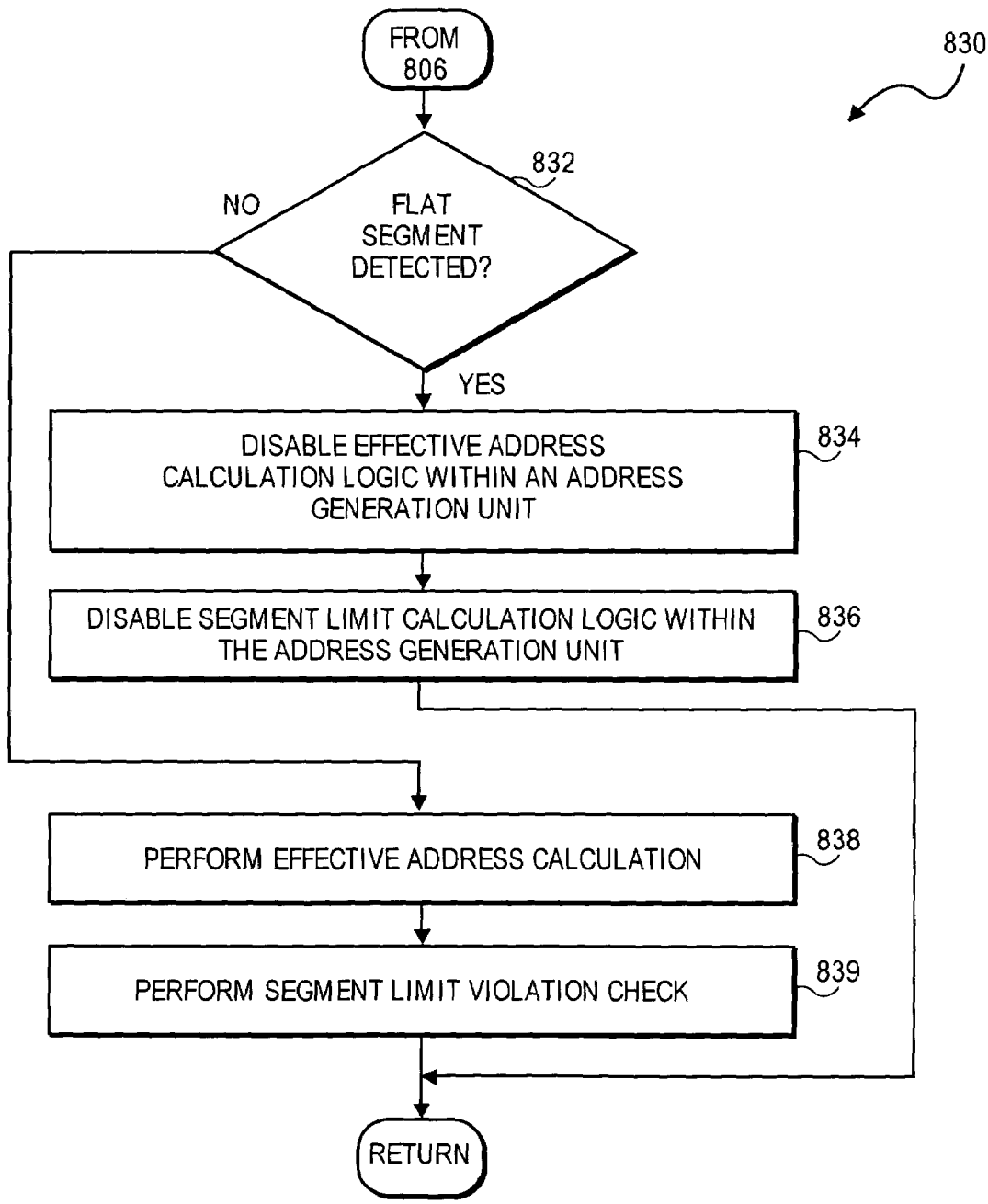
FIG. 11 is a flow chart illustrating a method for disabling logic within an address generation unit according to a determined operating system memory model in accordance with one embodiment of the present invention.

FIG. 11 is a flow chart illustrating a method 830 for power conservation within a mobile platform CPU address generation unit in accordance with one embodiment of the present invention. At process block 832 it is determined whether a flat segment is detected. In one embodiment, a flat segment detection is determined when a received flat segmentation signal is asserted.

Accordingly, when such is the case, at process block 834 effective address calculation logic within the address generation unit is disabled. Likewise, at process block 836 segment limit calculation logic within the address generation unit is also disabled. In doing so, a mobile platform CPU including the address generation unit 500 is able to conserve power by disabling logic when an operating system has selected a flat segmentation memory model as its memory configuration. Otherwise, effective address calculation and segment limit violation detection are performed at process blocks 838 and 839, respectively.

Figure 12:
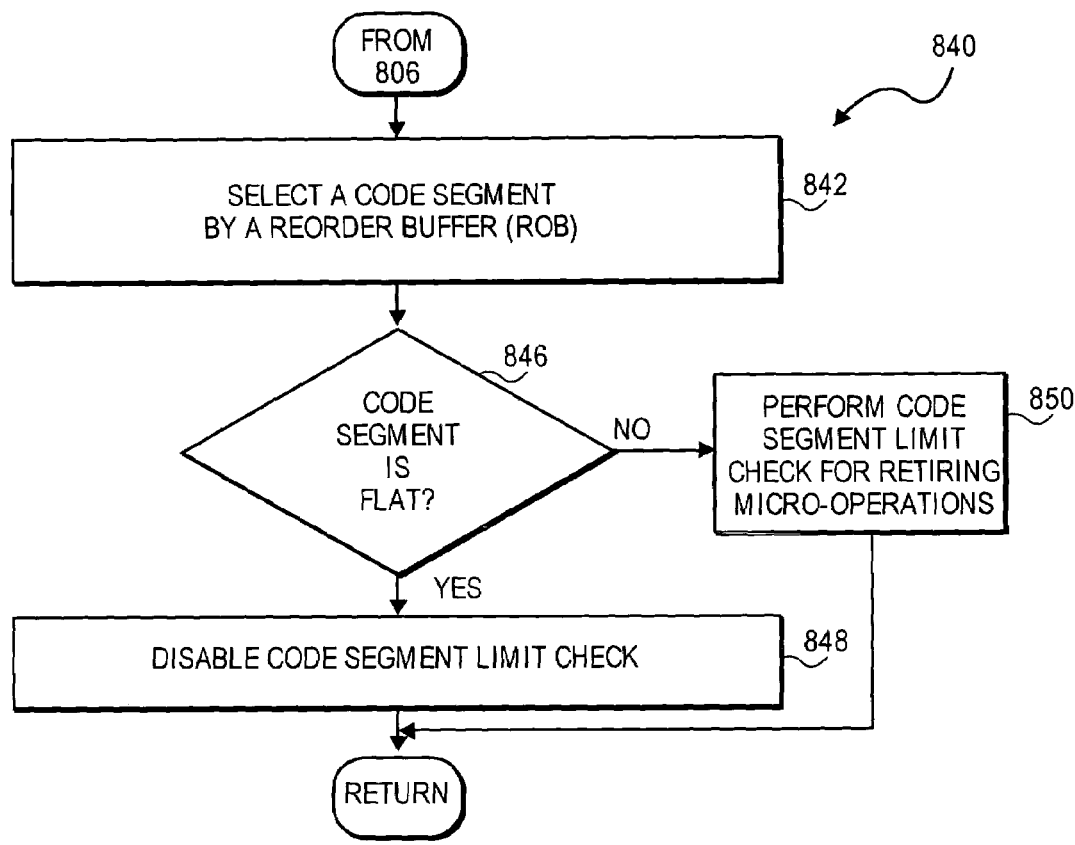
FIG. 12 is a flow chart illustrating a method for disabling logic within a retirement unit according to a determined operating system memory model in accordance with one embodiment of the present invention.

Finally, FIG. 12 is a flow chart illustrating a method 840 for power conservation within a retirement unit in accordance with one embodiment of the present invention. As indicated above, in one embodiment, upon a code segment register write to AGU 500, AGU 500 detects whether the code segment is flat or segmented, and updates a copy of the code segment in the ROB. Accordingly, at process block 842, a code segment is selected by a reorder buffer. Once selected, at process block 846 it is determined whether the selected code segment is a flat code segment. In one embodiment, the detection is made when a flat segment signal is asserted.

When a flat segment is detected, at process block 848 segment limit violation check within the ROB, is disabled. In one embodiment, the segment limit check is disabled by disabling a clock input to, for example, a dynamic barrow chain, used to calculate the limit violation. Otherwise, at process block 850 a segment limit calculation is performed for one or more retiring micro-operations. Accordingly, utilizing embodiments of the present invention a retirement unit may reduce its power consumption requirements by disabling segment limit violation logic when processing flat code segments. Accordingly, the retirement unit can quickly update an architectural state of processor following retirement of one or more micro-operations associated with the selected code segment.

Figure 13:
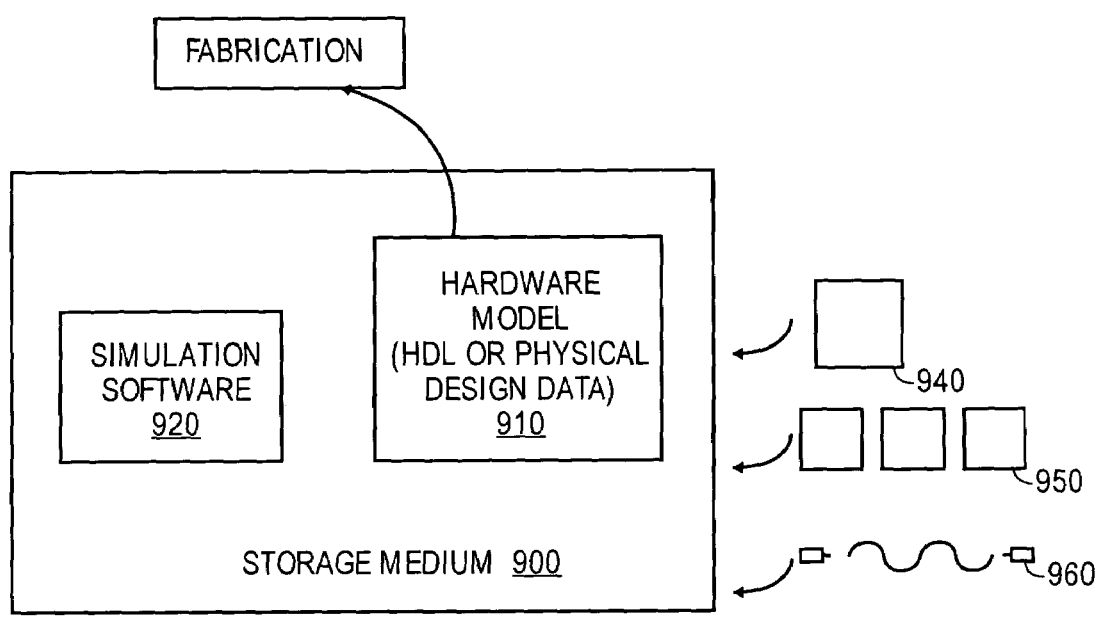
FIG. 13 is a block diagram illustrating various design representations or formats for simulation, emulation and fabrication of a design using the disclosed techniques.

FIG. 13 is a block diagram illustrating various design representations or formats for simulation, emulation and fabrication of a design using the disclosed embodiments. Data representing a design may represent the design in a number of manners. First, as is useful in simulations, the hardware may be represented using a hardware description language, or another functional description language, which essentially provides a computerized model of how the designed hardware is expected to perform. The hardware model 910 may be stored in a storage medium 900, such as a computer memory, so that the model may be simulated using simulation software 920 that applies a particular test suite 930 to the hardware model to determine if it indeed functions as intended. In some embodiments, the simulation software is not recorded, captured or contained in the medium.

Additionally, a circuit level model with logic and/or transistor gates may be produced at some stages of the design process. The model may be similarly simulated some times by dedicated hardware simulators that form the mode using programmable logic. This type of simulation taken a degree further may be an emulation technique. In any case, reconfigurable hardware is another embodiment that may involve a machine readable medium storing a model employing the disclosed techniques.

Furthermore, most designs at some stage reach a level of data representing the physical placements of various devices in the hardware model. In the case where conventional semiconductor fabrication techniques are used, the data representing the hardware model may be data specifying the presence or absence of various features on different mask layers or masks used to produce the integrated circuit. Again, this data representing the integrated circuit embodies the techniques disclosed in that the circuitry logic and the data can be simulated or fabricated to perform these techniques.

In any representation of the design, the data may be stored in any form of a machine readable medium. An optical or electrical wave 960 modulated or otherwise generated to transport such information, a memory 950 or a magnetic or optical storage 940, such as a disk, may be the machine readable medium. Any of those mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Alternate Embodiments

Several aspects of one implementation of the load/store AGUs for providing reduced power consumption have been described. However, various implementations of the flat segmentation memory model detection provide numerous features including, complementing, supplementing, and/or replacing the features described above. Features can be implemented as part of the reorder buffer (ROB) or as part of the address branching in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

Having disclosed exemplary embodiments and the best mode, modifications and variations may be made to the disclosed embodiments while remaining within the scope of the embodiments of the invention as defined by the following claims.

What is claimed is:

1. A method comprising:
   identifying a code/data segment contained within a segment register, as one of a segmented code/data segment and a flat code/data segment if a segment register update operation to the segment register is detected; and
   setting one or more bits within the segment register according to the identification of the code/data segment as one of a flat segment and a segmented segment.

2. The method of claim 1, wherein identifying the code/data segment further comprises:
   reading a base field of the segment register; reading a limit field of the segment register; and
   when the contents of the base portion match a predetermined base value and contents of the limit field match a predetermined limit value, identifying the code/data segment as a flat segment.

3. The method of claim 2, wherein reading the base portion of the segment register further comprising:
   determining whether the segment register update has completed an update of the base field of the segment register; and
   once the base field of the segment register is updated, reading contents of the segment register base field.

4. The method of claim 2, wherein reading the segment register limit field further comprises:
   once segment register update of the segment register base field is complete, determining whether the segment register update has a completed updating of the limit field of the segment register; and
   once update of the limit field of the segment register is complete, reading contents of the segment register limit field.

5. The method of claim 1, wherein settling the segment register further comprises: selecting a first predetermined bit within the segment register;
   setting the selected, first predetermined bit of the segment register according to contents of a base field of the segment register;
   selecting a second predetermined bit within the segment register; and
   setting the selected, second predetermined bit of the segment register according to contents of a limit field of the segment register.

6. The method of claim 5, wherein setting the first predetermined bit further comprises:
   when the code/data segment is identified as a flat segment, setting a ZERO-BASE BIT of the segment register to a value of one; and
   otherwise setting the ZERO-BASE BIT of the segment register to a value of zero.

7. The method of claim 5, wherein setting the second predetermined bit of the segment register further comprises:
   when the code/data segment is identified as a flat segment, setting a ONE-LIMIT BIT of the segment register to a value of one; and
   otherwise setting the ONE-LIMIT BIT of the segment register to a value of zero.

8. The method of claim 2, wherein the predetermined base value equals a value of zero.

9. The method of claim 2, wherein the predetermined limit value equals a hexadecimal value of "FFFFF".

10. The method of claim 1, further comprising:
    performing a segment register read operation;
    selecting a ONE-LIMIT BIT, a ZERO-BASE BIT, and a granularity bit of the segment register;
    when each selected bit is set to a predetermined value, identifying the code/data segment as a flat segment; and
    otherwise identifying the code/data segment as a segmented segment.

11. A method comprising:
    selecting a segment register in response to a segment register read operation; and
    identifying a code/data segment within the segment register as one of a flat segment and a segmented segment according to at least one predetermined bit within the selected segment register.

12. The method of claim 11, further comprising:
    when a flat segment is detected, disabling effective address calculation logic within an address generation unit; and
    disabling segment limit calculation logic within the address generation unit.

13. The method of claim 11, further comprising:
    when a flat segment is detected, calculating an address of a conditional, direct branch as a code segment base associated with the conditional direct branch.

14. The method of claim 11, further comprising:
    disabling, segment limit violation logic for one or more micro-operations of a macro instruction when a flat code segment is detected.

15. The method of claim 11, further comprising:
    selecting a ZERO-BASE BIT of the segment register;
    selecting a ONE-LIMIT BIT of the segment register; and
    selecting a granularity bit of the segment register.

16. The method of claim 11 wherein identifying the code/data segment further comprises:
    selecting a ZERO-BASE BIT, a ONE-LIMIT BIT and a granularity bit of the segment register;
    performing a conditional AND operation according to a value of the selected ZERO-BASE BIT, the selected ONE-LIMIT BIT and the selected granularity bit; and
    when a result of the conditional AND operation is a one, identifying the code/data segment as a flat segment.

17. The method of claim 12, wherein disabling the effective address calculation logic further comprises:
    disabling a clock input to a dynamic effective address adder used to calculate an effective address for the code/data segment.

18. The method of claim 12, wherein disabling the segment limit calculation logic further comprises:
    disabling a clock input to a dynamic borrow chain used to determine a segment limit violation according to the code/data segment.

19. The method of claim 14, wherein disabling further comprises:
    selecting, by a reorder buffer (ROB), a code segment;
    disabling a clock input to a dynamic barrow chain used to calculate a segment limit violation when the selected segment is identified as a flat segment.

20. The method of claim 11, wherein prior to identifying the code/data segment, the method further comprises:
    monitoring a segment register to detect a segment register update operation;

once a segment register update operation is detected, identifying a code/data segment contained within the segment register, as one of a segmented code/data segment and a flat code/data segment; and setting one or more bits of the segment register according to the identification of the code/data segment as one of a flat segment and a segmented segment.

21. A segment unit comprising:

a segment register file; and an interface coupled to the segment register file, the interface to identify a code/data segment contained within a segment register, as one of a segmented code/data segment and a flat code/data segment if a segment register update operation to the segment register is detected, and to set one or more bits of the segment register according identification of the code/data segment as one of a flat segment and a segmented segment.

22. The segment unit of claim 21, wherein the interface is to cause assertion/deassertion of a flat segment signal, the interface to cause assertion/deassertion according to one or more control bits of the segment register if a segment register read operation is detected.

23. The segment unit of claim 21, wherein the interface is to set a segment register ZERO-BASE BIT according to contents of a base field of the segment register and to set a ONE-LIMIT BIT of the segment register according to contents of a limit field of the segment register.

24. The segment unit of claim 22, wherein the interface further comprises:

logic to assert/deassert the flat segment signal according to a logical AND operation of a ZERO-BASE BIT, a ONE-LIMIT BIT and a granularity bit of the segment register file.

25. A system comprising:

a bus;

a chipset coupled to the bus; and a processor, coupled to the bus, comprising: a segment register file, and an interface coupled to the segment register file, the interface to identify a code/data segment contained within a segment register, as one of a segmented code/data segment and a flat code/data segment if a segment register update operation to the segment register is detected, and to set one or more bits of the segment register according to identification of the code/data segment as one of a flat segment and a segmented segment.

26. The system of claim 25, wherein the processor comprises:

an address generation unit to perform a register read operation according to load/store operations, the address generation unit to disable effective address calculation logic and segment limit violation logic according to a flat segment signal received from the segment unit.

27. The system of claim 25, wherein the processor further comprises:

a retirement unit including a reorder buffer (ROB), the ROB to disable/enable segment limit violation logic for selected code segments identified as flat segments if a segment register read operation is performed.

28. An article comprising a machine readable medium that carries data which, when loaded into a computer system memory in conjunction with simulation routines provides functionality of a model comprising: a processor, comprising:

a segment register file, and an interface coupled to the segment register file, the interface to identify a code/data segment contained within a segment register, as one of a segmented code/data segment and a flat code/data segment if a segment register update operation to the segment register is detected, and to update at least one bit within the segment register according to identification of the code/data segment as one of a flat segment and a segmented segment.

29. The article of claim 28, wherein the model further comprises:

an address generation unit to perform a register read operation according to load/store operations, the address generation unit to disable effective address calculation logic and segment limit violation logic according to a flat segment signal received from the segment unit.

30. The article of claim 28, wherein the model further comprises:

a retirement unit including a reorder buffer (ROB), the ROB to disable/enable segment limit violation logic for selected code segments identified as flat segments if a segment register read operation is performed.

31. An apparatus, comprising:

a processor, coupled to a bus, comprising:

a segment register file, and an interface coupled to the segment register file, the interface to identify a code/data segment contained within a segment register, as one of a segmented code/data segment and a flat code/data segment if a segment register update operation to the segment register is detected, and to update at lest one bit with the segment register according to identification of the code/data segment as one of a flat segment and a segmented segment.

32. The apparatus of claim 31, wherein the processor comprises:

an address generation unit to perform a register read operation according to load/store operations, the address generation unit to disable effective address calculation logic and segment limit violation logic according to a fiat segment signal received from the segment unit.

33. The apparatus of claim 31, wherein the processor further comprises:

a retirement unit including a reorder buffer (ROB), the ROB to disable/enable segment limit violation logic for selected code segments identified as flat segments if a segment register read operation is performed.

* * * * *